March 22, 1932.  C. E. JOHNSON  1,850,674
PISTON RING EXPANDER
Filed Sept. 17, 1930    3 Sheets-Sheet 1

Inventor
Charles E. Johnson
By Liverance
and
Van Antwerp
Attorneys

March 22, 1932. C. E. JOHNSON 1,850,674
PISTON RING EXPANDER
Filed Sept. 17, 1930  3 Sheets-Sheet 2

Inventor
Charles E. Johnson
By
Liverance and Van Antwerp
Attorneys

March 22, 1932.     C. E. JOHNSON     1,850,674

PISTON RING EXPANDER

Filed Sept. 17, 1930     3 Sheets-Sheet 3

Inventor
Charles E. Johnson
By
Linrance & Van Antwerp
Attorneys

Patented Mar. 22, 1932

1,850,674

UNITED STATES PATENT OFFICE

CHARLES E. JOHNSON, OF MUSKEGON, MICHIGAN, ASSIGNOR TO THE PISTON RING COMPANY, OF MUSKEGON, MICHIGAN, A CORPORATION OF MICHIGAN

PISTON RING EXPANDER

Application filed September 17, 1930. Serial No. 482,448.

This invention relates to piston ring expanders and is more particularly directed to a novel construction of expander which is made from a length of wire in such manner that contact is made with the inner side of a piston ring at spaced apart points in its length and through substantially the entire width of the ring, while between the points of contact with the ring, the expander bears against the bottom of the ring groove in which the ring is located and thereby furnishes a substantially uniform outward expanding pressure against the inner side of the piston ring to press the same against the walls of a cylinder.

The expander which I have devised and which may be made in various forms, is particularly available for use with rings having oil passing slots or openings therethrough, without the necessity of cutting away any portions of the material from which the expander is made, as is necessary when the expanders are made from flat ribbon material, for the reason that the wire from which the expander is made does not occupy the full height of the ring groove and there is plenty of space for the passage of the oil past the expander to the drainage openings leading from the ring groove to the interior of the piston. Likewise, the matter of the pressure exerted by ring expanders is one requiring close attention and ring expanders made from the ribbon material as now commonly used are very liable to be too stiff and exert too heavy a pressure with danger of scoring the cylinder walls because of such pressure, while with the wire material used for expanders in my invention, as small and flexible a wire as may be needed can be used without the production of dangerous or undesired pressures.

An understanding of the invention may be had from the following description, taken in connection with the accompanying drawings, in which, Fig. 1 is a fragmentary section and elevation, with parts broken away, illustrating one form of the expander of my invention located in ring grooves in a piston which in turn is mounted in a cylinder.

Like reference characters refer to like parts in the different figures of the drawings.

Figure 4:
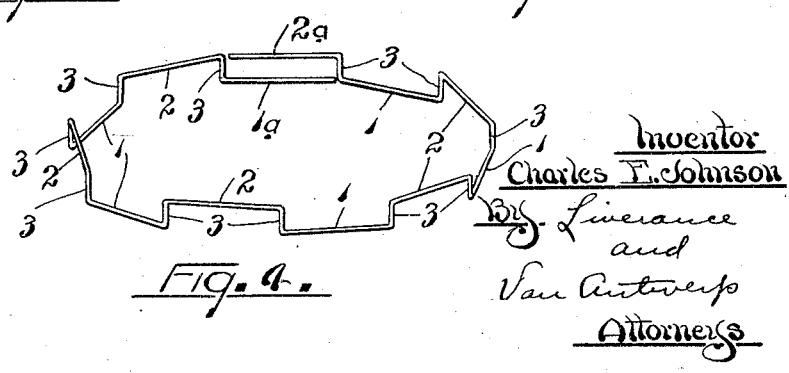
Fig. 4 is a perspective view thereof.

In the construction of the first form of the ring expander, as shown in Figs. 1 to 4 inclusive, a single length of wire of the proper length is bent, as best shown in Fig. 4, to provide alternate lower horizontal sections 1 and upper sections 2 connected by vertical tie sections 3. The end sections 1a and 2a of the expander are adapted to pass by each other when located within a piston ring groove as shown in Fig. 4. The distance between the upper and lower sections 1 and 2 of the expander is such that the expander may freely enter a piston ring groove, such as a groove in a piston 4 in Fig. 1.

Figure 1:
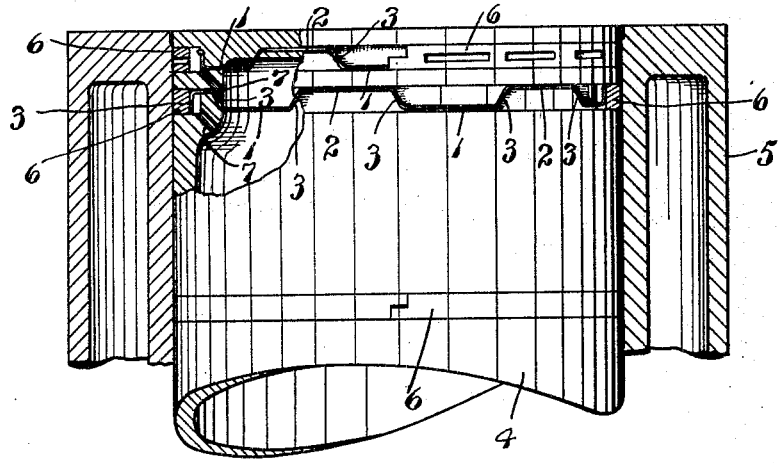
Figure 2:
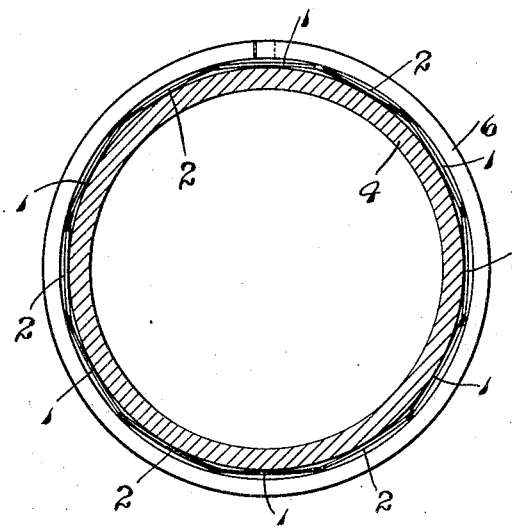
Fig. 2 is a horizontal section through a piston at a ring groove therein, showing the expander between the bottom of the ring groove and the inner side of a piston ring.
Figure 3:
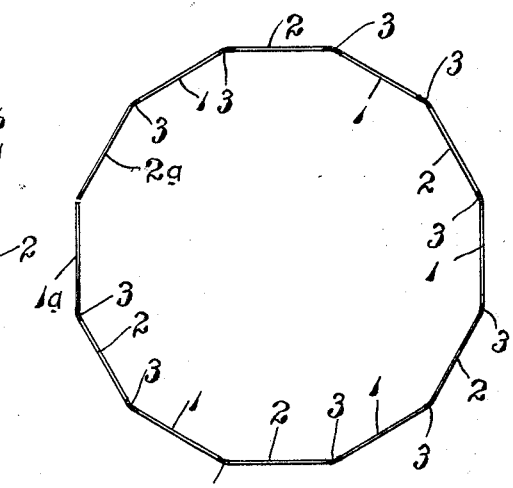
Fig. 3 is a plan view of the expander of my invention.

Pistons like those indicated at 4 are adapted to reciprocate in cylinders, as 5, and receive a plurality of rings 6 in the ring grooves thereof. The expander of my invention is located within a groove at the inner side of a piston ring. The piston ring may be either of the solid cross section snap variety or may have oil passing slots therethrough as shown. The tie sections 3 between the upper and lower sections 1 and 2 bear against the inner sides of the piston ring while the middle points of the horizontal sections 1 and 2 bear against the bottom of the ring groove as shown in Fig. 2; and the end sections 1a and 2a at their middle points both bear against the bottom of the ring groove and in this manner compensate for any weakness which might be present in the expander due to the parting at its side.

It is evident that with this construction the ring is acted upon at a plurality of spaced apart points on its inner circumference by the expander which serves to uniformly press the ring outward against the cylinder walls. Any oil passing through the oil carrying slots of the ring to a ring groove may pass freely by the expander to the drainage openings 7 which lead from the bottoms of the ring grooves to the interior of the piston. The section 3 of the expander, extending as they do across the entire width of the ring, press the ring uniformly at all points between its upper and lower sides. It is evident also that the wire from which the expander is made may be of any desired size so as to obtain a desired amount of expanding pressure.

Figure 5:
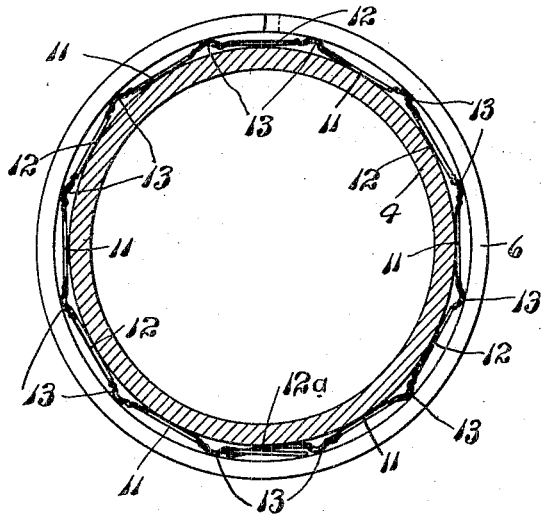
Fig. 5 is a view similar to Fig. 2 showing a different form of construction of expander from that illustrated in the previous figures.
Figure 6:
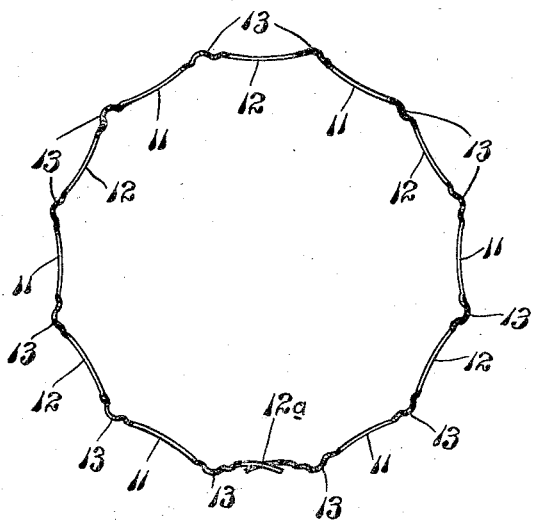
Fig. 6 is a plan view and Fig. 7 is a perspective view thereof.
Figure 7:
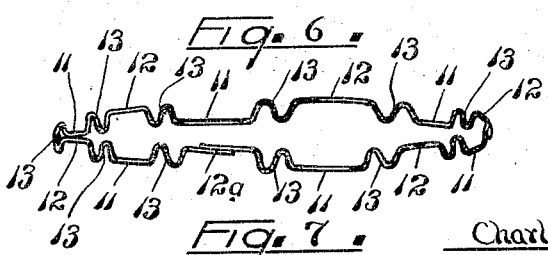

In Figs. 5, 6 and 7 a different form of the invention is shown wherein the lower horizontal sections 11 and the upper horizontal sections 12 are connected by a connecting section 13 substantially in the form of an S-curve and it is these parts 13 which bear against the inner side of the ring 6 while the middle points of the sections 11 and 12 bear against the bottom of the ring groove. The ends 12a of the expander overlap for purposes of strength and obviating weakness at the parting in the same manner as in the structure shown in Fig. 4.

Figure 8:
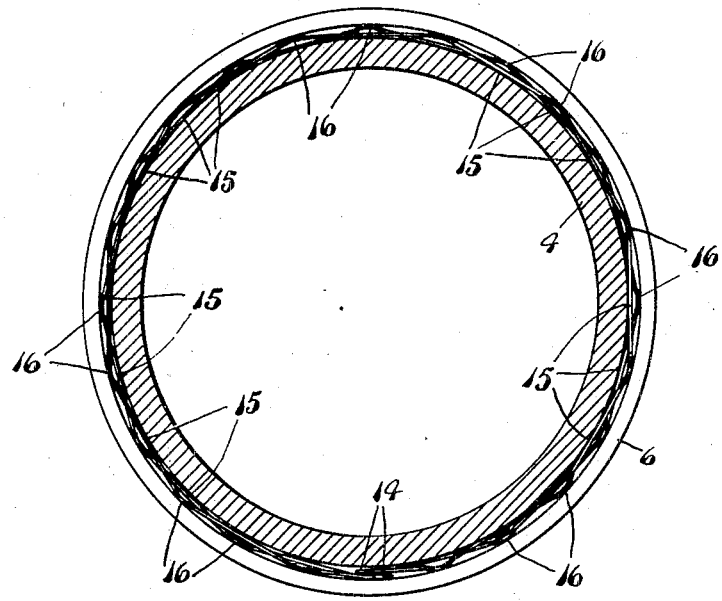
Fig. 8 is a section similar to Figs. 2 and 5, illustrating the use of a still further form of ring expander in accordance with my invention.
Figure 9:
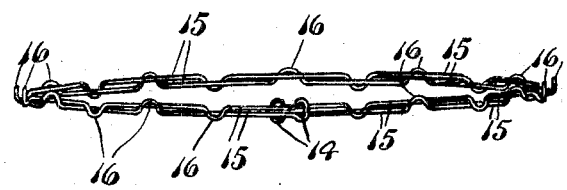
Fig. 9 is a perspective view thereof.

In Figs. 8 and 9 a still further form of the invention is shown in which the circular expander is made of a double length of wire which has overlapping loops 14 at its ends with horizontal sections 15 extending therefrom one above and one below the other, the upper sections 15 being provided with downwardly projecting loops or ties 16 and the lower sections with upwardly projecting loops or ties 16, as shown in Fig. 9, and the downwardly and upwardly extending loops around the expander are in staggered relation to each other. This form of ring expander will be made of wire of very small diameter. The loops 16 bear against the inner side of the ring and the intermediate points of the connecting sections 15 against the bottom of the ring groove as shown in Fig. 8. With this form of expander the number of points of contact of the same with the bottom of the ring groove and with the inner side of the piston ring is greatly increased and the uniformity of outward expanding force of the expander is proportionately bettered.

The invention is one of practical merit. It is very economical to produce. It is available for either a strictly compression ring or for oil drainage rings without change or modification.

The invention is defined in the appended claims and is to be considered comprehensive of all forms of structure coming within their scope.

I claim:

1. A spreader for piston rings formed of wire and adapted to be located between the bottom of a ring groove and the inner side of a piston ring comprising, horizontal sections of wire connected by interposed ties lying substantially in vertical planes, said ties being adapted to bear against the inner side of the piston ring and the horizontal sections against the bottom of the ring groove substantially midway between the ends of said horizontal sections.

2. A piston ring spreader comprising a single length of wire doubled upon itself and connected at its ends, said doubled wire being shaped into substantially circular form with the ends thereof overlapping, each of said wires of the spreader being provided at spaced apart integrals with vertically projecting loops therein.

3. A construction containing the elements in combination defined in claim 2, said loops being disposed in staggered relation to each other and alternately extending in an upward direction and in a downward direction from the wires.

4. A piston ring spreader formed of wire or its equivalent adapted to be located between the bottom of a ring groove and the inner side of a piston ring comprising horizontal sections of wire connected by ties, said ties being adapted to bear against the inner side of the piston ring and the horizontal sections being adapted to bear against the bottom of the ring groove between the points of contact of the ties and the piston ring.

In testimony whereof I affix my signature.

CHARLES E. JOHNSON.